United States Patent [19]

Warren et al.

[11] Patent Number: 6,005,885
[45] Date of Patent: *Dec. 21, 1999

[54] METHODOLOGY FOR DISCONTINUOUS RADIO RECEPTION UTILIZING EMBEDDED FRAME LENGTH WORDS

[75] Inventors: Bruce G. Warren, Poulsbo; Alan F. Jovanovich, Des Moines; John W. Mensonides, Monroe, all of Wash.

[73] Assignee: Intermec IP Corp., Woodland Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/570,982

[22] Filed: Dec. 12, 1995

[51] Int. Cl.$^6$ .................................................. H04B 1/707
[52] U.S. Cl. .................... 375/206; 340/825.07; 370/311; 370/349; 370/475; 455/38.3; 455/574; 455/343
[58] Field of Search ..................................... 375/200, 205, 375/206; 340/825.44, 825.07, 825.52; 455/343, 38.3, 574; 370/311, 401, 318, 349, 475, 465; 379/58, 63

[56] References Cited

U.S. PATENT DOCUMENTS

| | | |
|---|---|---|
| 3,614,639 | 10/1971 | Belman .................................... 375/324 |
| 4,383,257 | 5/1983 | Giallanza et al. .................. 340/825.47 |
| 4,506,386 | 3/1985 | Ichikawa et al. . |
| 4,523,332 | 6/1985 | Mori . |
| 4,663,623 | 5/1987 | Lax et al. . |
| 4,736,390 | 4/1988 | Ward et al. . |
| 4,745,408 | 5/1988 | Nagata et al. . |
| 4,837,854 | 6/1989 | Oyagi et al. . |
| 4,839,639 | 6/1989 | Sato et al. . |
| 4,903,335 | 2/1990 | Shimizu . |
| 4,996,526 | 2/1991 | DeLuca .............................. 340/825.44 |
| 5,010,330 | 4/1991 | Snowden et al. ........................ 455/343 |
| 5,142,279 | 8/1992 | Jasinski et al. ........................ 455/31.3 |
| 5,230,084 | 7/1993 | Nguyen . |
| 5,239,557 | 8/1993 | Dent . |
| 5,241,542 | 8/1993 | Natarajian et al. ..................... 455/343 |
| 5,241,561 | 8/1993 | Barnard . |
| 5,241,566 | 8/1993 | Jackson . |
| 5,381,133 | 1/1995 | Erhart et al. . |
| 5,410,734 | 4/1995 | Choi et al. . |
| 5,440,298 | 8/1995 | Kuramatsu . |
| 5,442,662 | 8/1995 | Fukasawa et al. ...................... 375/205 |
| 5,495,500 | 2/1996 | Jovanovich et al. . |
| 5,519,762 | 5/1996 | Barlett .................................... 455/343 |
| 5,537,100 | 7/1996 | Hallberg . |
| 5,740,529 | 4/1998 | Ide ........................................ 455/343 |
| 5,794,137 | 8/1998 | Harte ..................................... 455/343 |

Primary Examiner—Don N. Vo
Attorney, Agent, or Firm—O'Melveny & Myers LLP

[57] ABSTRACT

A radio receiver for direct sequence spread spectrum radio frequency (RF) signals is provided which discontinues radio reception when it is recognized that a received signal is intended for another such receiver. As a result, the receiving apparatus draws substantially less electrical current than conventional spread spectrum receivers. The apparatus provides for demodulation of an RF signal to recover digital information in the form of a transmitted message packet having a header portion and a data portion. The apparatus determines a message address and data length from the header portion. If the determined address does not correspond to the distinct apparatus address of the particular receiver, the apparatus disables the signal demodulation operation for a discrete period of time corresponding to the determined data length.

28 Claims, 2 Drawing Sheets

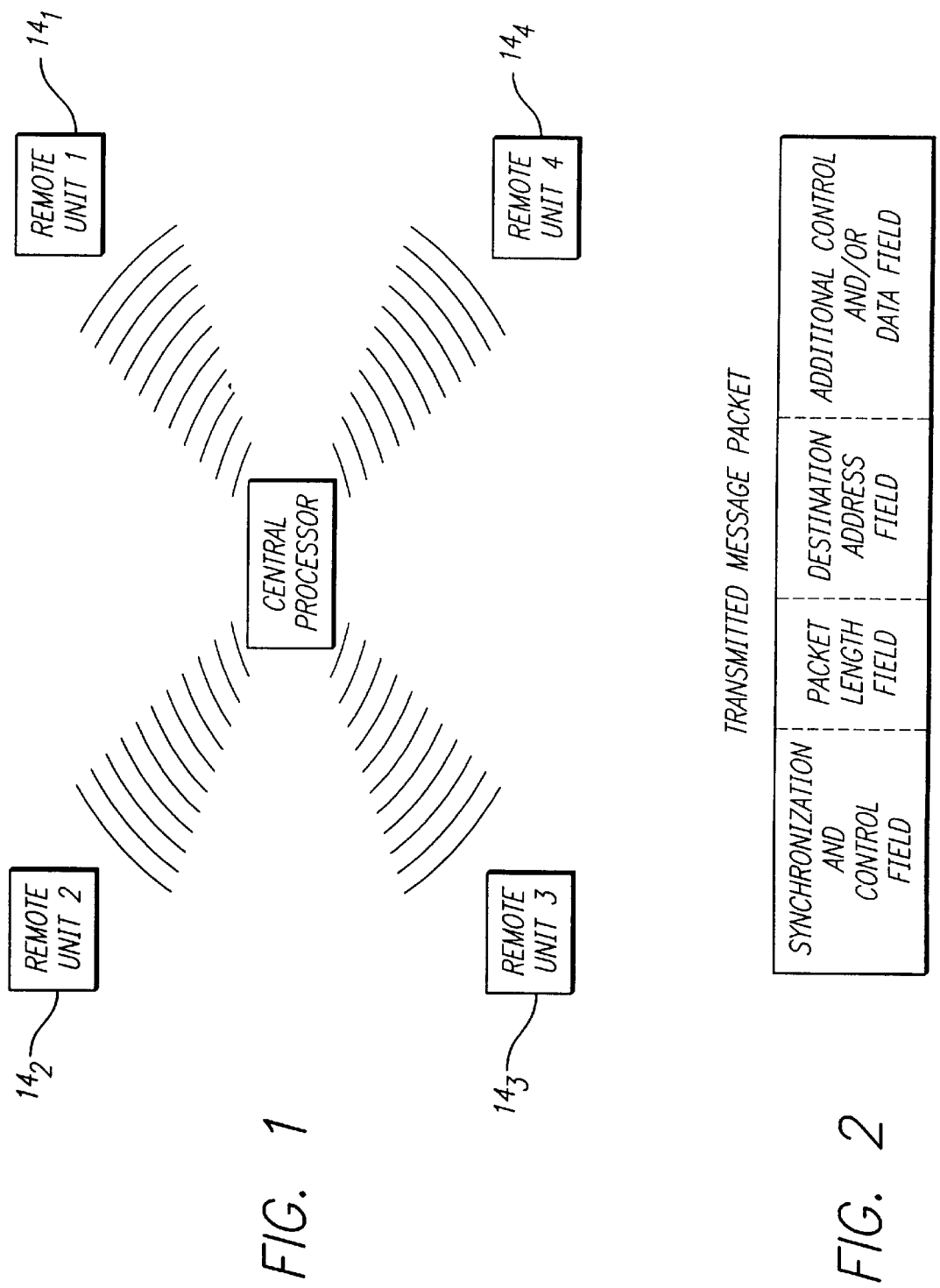

METHODOLOGY FOR DISCONTINUOUS RADIO RECEPTION UTILIZING EMBEDDED FRAME LENGTH WORDS

BACKGROUND OF THE INVENTION

1. Field of the Invention

The present invention relates to radio receivers for direct sequence spread spectrum communications, and more particularly, to a radio system that conserves electrical power by discontinuing radio reception upon detection of an invalid embedded address within a transmitted message packet.

2. Description of Related Art

Spread spectrum modulation techniques are increasingly desirable for communications, navigation, radar and other applications. In a spread spectrum system, the transmitted signal is spread over a frequency band that is wider than the minimum bandwidth required to transmit the information being sent. As a result of the signal spreading, spread spectrum systems have reduced susceptibility to interference or jamming, and enable high data integrity and security. Moreover, by spreading transmission power across a broad bandwidth, power levels at any given frequency within the bandwidth are significantly reduced, thereby reducing interference to other radio devices. In view of these significant advantages, spread spectrum communication systems are highly desirable for commercial data transmission.

In one type of spread spectrum communication system, a radio frequency (RF) carrier is modulated by a digital code sequence having a bit rate much higher than that of the information signal. These systems are known as "direct sequence" modulation systems. One type of a direct sequence spread spectrum system includes the RF carrier modulated by two data streams in quadrature with each one having one phase when the data stream code sequence represents a data "one" and 180° phase shift when the data stream code sequence represents a data "zero." This type of modulation is commonly referred to as Quadrature Phase Shift Key (QPSK) modulation.

It is also known to use a plurality of spread spectrum radio receivers that are coupled together in a wireless local area network (LAN). A central host processing unit could send information to and receive information from any one of the plurality of remotely disposed receivers. In such a wireless LAN, the remote receivers may comprise portable units that operate within a defined environment to report information back to the central host processing unit. Each of the remote receivers would communicate with the host processing unit using the same RF carrier frequency and digital code sequence. It should be apparent that such wireless LAN systems offer increased flexibility over hardwired systems by enabling operators of the remote receivers substantial freedom of movement through the environment.

The individual radio receivers amplify and filter an RF signal transmitted from the host processing unit to remove the RF carrier and provide a digital information signal that has been modulated by the digital code sequence. The receiver then "de-spreads" the digital signal by use of a digital match filter that is correlated with the digital code sequence to remove the modulation and recover the digital information. Discrete digital bits of the de-spread digital information are then assembled into packets having a predefined format that can be processed subsequently by use of conventional data processing logic systems, such as a microprocessor, digital signal processor, and the like.

The predefined message packet format typically includes a header portion followed by associated data. The header portion determines the routing of the message by identifying which one of the remote receivers is the intended recipient of the message, and may also include various other predefined data fields, such as message length, error correction codes, etc. Since each individual receiver does not know when to expect a message from the host processing unit, the receivers must constantly monitor all transmitted signals to determine whether a particular message is intended for them. Transmitted data will normally follow the header portion in the message packet.

A drawback with such wireless systems is the limited power source of the remote receivers. The digital signal processing circuitry that performs the de-spreading of the received signals draws a significant amount of electrical power. To maximize flexibility and freedom of movement, the remote receivers include a rechargeable battery system. When not in use, the remote receivers could be plugged into a recharging station that restores the battery system to a fully charged state. Nevertheless, such battery systems necessarily increase the weight and bulk of the remote radio receivers, as a heavier battery system would provide greater storage capacity and longer operational life. Radio system designers must trade off weight of the receiver against its operational life, and have long sought ways to reduce the power requirements of a remote receiver in order to further extend the operational life without having to increase the battery system capacity.

Thus, it would be desirable to provide a remote radio receiver for direct sequence spread spectrum communication system that draws reduced electrical current in order to maximize operational life between charging cycles. More particularly, it would be desirable to provide a remote radio receiver capable of recognizing when a received signal is intended for another receiver and discontinuing radio reception and associated digital signal processing during that discrete period of time.

SUMMARY OF THE INVENTION

In accordance with the teachings of the present invention, a radio receiver for direct sequence spread spectrum radio frequency (RF) signals is provided which discontinues radio reception when it recognizes that a received signal is intended for another such receiver of a wireless LAN. As a result, the receiving apparatus draws substantially less electrical current than conventional spread spectrum receivers.

Particularly, the apparatus provides for demodulation of an RF signal to recover digital information in the form of a transmitted message packet having a header portion and a data portion. The apparatus determines a message address and data length from the header portion. As known in the art, all receivers operating within a wireless LAN have a distinct apparatus address. If the determined address does not correspond to the distinct apparatus address, the apparatus disables the signal demodulation operation for a period of time that corresponds to the determined data length.

More specifically, the apparatus provides a control signal if the determined address does not correspond to the distinct apparatus address. A power management circuit receives the control signal, and uses it to control a clock signal to the RF signal demodulation circuitry. Since the demodulation circuitry draws a substantial amount of electrical current during operation, discontinuing operation of the demodulation circuitry during the transmitting time of a message intended for another receiver will significantly reduce power consumption.

A more complete understanding of the apparatus for discontinuous radio reception will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 illustrates a wireless LAN system having a central processor adapted to communicate with a plurality of remote radio receivers;

FIG. 2 is a diagram illustrating header and data fields of an exemplary transmitted message packet.

DETAILED DESCRIPTION OF THE PREFERRED EMBODIMENT

Figure 3:
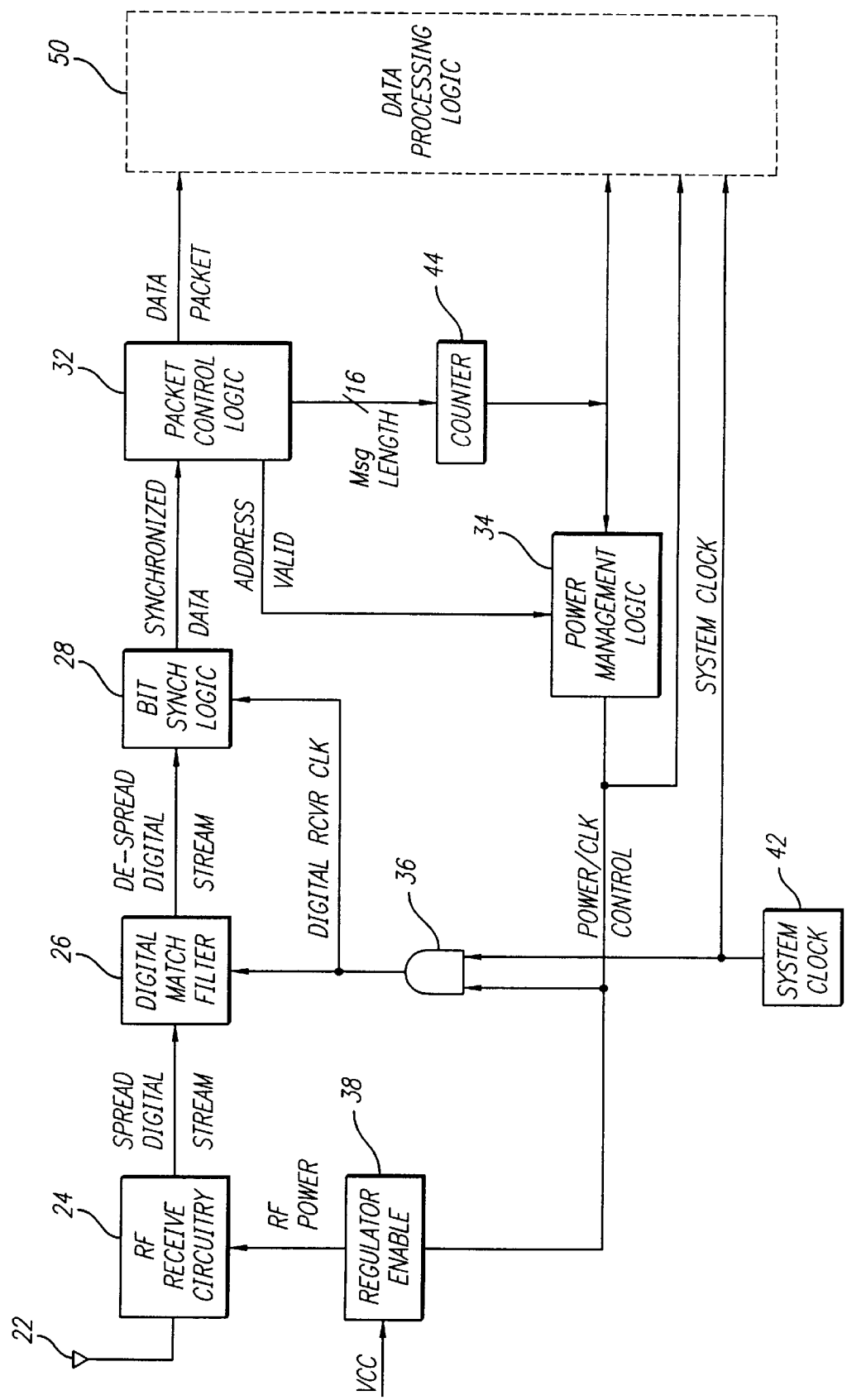
FIG. 3 is a block diagram of a remote radio receiving apparatus of the present invention.

The present invention satisfies the need for a remote radio receiver for direct sequence spread spectrum communication system that draws reduced electrical current in order to maximize operational life between charging cycles. As described below, the radio receiver recognizes when a received signal is intended for another receiver and discontinues radio reception and associated digital signal processing during that discrete period of time. In the detailed description that follows, like reference numerals are used to describe like elements in one or more of the figures.

Referring first to FIG. 1, a wireless LAN is illustrated. The wireless LAN comprises a central processor 12 and a plurality of remote receiver units $14_1$ through $14_4$. The central processor 12 generally comprises a base station that serves as a host and file server for the wireless LAN. The central processor 12 may further include substantial data storage capability, such as for maintaining records of data collected from each of the remote units $14_1$ through $14_4$. The remote units $14_1$ through $14_4$ are portable, and can be carried by operators to collect data that is transmitted to the central processor 12 for processing and storage. It should be appreciated that each of the remote units $14_1$ through $14_4$ and the central processor 12 include both a receiving and a transmitting capability, though the present invention is directed primarily to the transmitting ability of the central processor and the receiving ability of the remote units.

In the wireless LAN of the present invention, direct sequence spread spectrum modulation is used to transmit digital information between the central processor 12 and the remote units $14_1$ through $14_4$. The central processor 12 broadcasts messages to each of the remote units $14_1$ through $14_4$ simultaneously using the same bandwidth and the same digital code sequence used to modulate encoded digital information. Even though a particular message may be intended for only one of the remote units, the other remote units must also monitor the transmissions from the central processor 12 to determine the intended destination for the messages. For example, if the central processor 12 transmits a message intended for remote unit 2, shown as $14_2$, the other three remote units also invariably monitor the message transmission as well. As will be further described below, these other remote units waste power by listening to the transmitted message when it is not intended for them.

All messages transmitted from the central processor 12 are formulated into predefined data packets. FIG. 2 illustrates an exemplary message data packet as comprising four major sections, including a synchronization/control field, a packet length field, a destination address field, and a data field that may contain additional control information, data, or some combination of control information and data. The synchronization/control field contains a unique word to indicate the start of a packet. The unique word is used for every message and is chosen to minimize the occurrences of data being mistaken for a synchronization word. Additional control parameters may be inserted in this field as desired. The packet length field defines the length of the packet, i.e., the size of the data or control information contained within the packet. The destination address field defines the intended destination of the packet. Each of the remote units $14_1$ through $14_4$ have a unique address, and a message packet contains a "valid" address if the information in the destination address field matches the remote unit address. These first three fields are referred to as the header of the message packet. Finally, the additional control and/or data field contains the information that is being conveyed by the packet.

Referring now to FIG. 3, a block diagram of a receiving apparatus constructed in accordance with the present invention is illustrated. The receiving apparatus of FIG. 3 corresponds to each respective one of the remote units $14_1$ through $14_4$ of FIG. 1. The receiving apparatus receives and processes the RF signals transmitted from the central processor 12.

In particular, an RF signal is received by an antenna 22 and processed by RF receive circuitry 24. The RF receive circuitry 24 amplifies and filters the RF signal to provide a spread digital data stream that contains modulation by the digital code sequence, or spreading code. The RF receive circuitry 24 passes the spread digital data stream to a digital match filter 26. The digital match filter 26 is correlated with the digital code sequence, and removes the code modulation from the digital data stream to provide a de-spread digital data stream. As known in the art, the digital match filter 26 may multiply the spread digital data stream by the digital code sequence to remove the modulation and restore the original digital data transmitted by the central processor 12.

The de-spread digital data stream is then provided to a bit synchronization logic stage 28, or bit-synch logic, that synchronizes the data stream with a clock signal. The synchronized data stream is provided to a packet control logic unit 32 that formulates the data stream into distinct packets, and deciphers the data contained within the header fields described above. If the destination address within the header fields is valid for the particular remote unit, the packet control logic unit 32 passes the data packets to unique data processing logic 50 within the remote unit. The RF receive circuitry 24, digital match filter 26, bit-synch logic 28, and packet control logic 32 are generally known to conventional RF receivers for spread spectrum data.

As known in the art, direct sequence spread spectrum digital receivers can draw an exceptionally high amount of electrical current due particularly to the power requirements of the RF receive circuitry and the digital match filter. To satisfy the Nyquist sampling criterium, the digital data must be sampled at twice the data rate or higher. For example, a received direct sequence spread spectrum signal modulated at 1 MHz with an eleven bit digital code sequence must be sampled at a rate of at least 22 MHz. After the signal is de-spread, the recovered digital data is processed at a clock rate of 1 MHz.

Complementary Metal Oxide Semiconductor (CMOS) circuitry is the most widely used technology for the digital portion of the receiver, and power consumption within CMOS circuitry varies with the clock rate. Specifically, power consumption within CMOS technology is a function of the switching rate of a gate. Therefore, in the present invention, the clocking of the digital circuitry is effectively stopped to cause the circuitry to go to a virtual zero power mode without degrading receiver performance. Also, the power applied to the analog portion of the receiver is removed to realize additional power savings. While it is not essential that the receiving apparatus of the present invention be implemented with CMOS circuitry, the power savings aspects of the present invention would provide a greatest benefit by using such CMOS circuitry.

In FIG. 3, the packet control logic 32 determines the destination address and packet length from the header of a received message. The packet control logic 32 is pre-coded with the unique address of the particular remote unit, and compares the pre-coded address with the determined address. If the addresses match, the packet control logic 32 sends a signal to a power management logic unit 34. The power management logic unit 34 controls the application of power and clock to the receiver.

Specifically, the power management logic unit 34 has a control output coupled to both an input of an AND logic device 36 and to an enable input of a power regulator 38. The power regulator 38 is coupled to the RF receive circuitry 24, and provides it with regulated RF power from a voltage source VCC. A second input to the AND logic device 36 is coupled to a system clock 42 that provides a clock signal for the digital match filter 26, the bit-synch logic unit 28 and the data processing logic 50. The control output from the power management logic unit 34 is at a normally high logic state, so that the clock signal passes from the system clock 42 to the digital match filter 26 and the bit-synch logic unit 28 through the AND logic device 36. Also, the regulator 38 is normally enabled by application of the high output from the power management logic unit 34.

At the start of a message transmission, the receiving apparatus is in a listening mode in view of the normally high control output from the power management logic unit 34. If the packet control logic 32 detects a match between the addresses (i.e., the message is intended for the particular remote unit), the control output from the power management logic unit 34 will remain high. Conversely, if the addresses do not match (i.e., the message is not intended for the particular remote unit), the control output from the packet control logic 32 will change to low. The low control output signal will discontinue operation of the receiving apparatus by shutting off clock to the digital match filter 26 and the bit synch logic unit 28, and by shutting off RF power to the RF receive circuitry 24.

Since the receiving apparatus need only stop listening for the time interval during which the RF channel is occupied with the current message, it is necessary to restore full receive operation once transmission of the message is complete. Accordingly, a counter 44 is provided to notify the power management logic unit 34 when it is time to restore the control output to the high logic state. The counter 44 provides a signal to the power management logic unit 34. The packet control logic 32 determines the packet length from the header, and calculates a time interval value that would correspond to transmission of the remainder of the message based on the determined packet length and the known data rate. The calculated time interval value is provided by the packet control logic 32 to the counter 44. The counter 44 then counts down the elapsed time corresponding to the calculated time interval value. When the calculated time value is reached, the counter 44 provides an associated signal to the power management unit 34, which then restores its output signal to the normally high logic state. Thereafter, the receiving apparatus is again able to monitor the RF channel for a valid message packet.

The control output from the power management logic 34 may also be provided to the data processing logic 50. This way, the data processing logic 50 may also be able to selectively disable certain internal aspects of operation in order to provide additional power savings for the receiving apparatus. The data processing logic 50 may also be provided with the signal from the counter 44, so that the data processing logic will know when the receiving apparatus resumes its normal listening mode.

Having thus described a preferred embodiment of an apparatus and method for discontinuous radio reception using embedded frame length and address data, it should be apparent to those skilled in the art that certain advantages of the within system have been achieved. Particularly, battery life for the remote unit is extended by disabling the receiver circuitry when an invalid address is detected, yet the overall performance of the remote unit does not suffer.

It should also be appreciated that various modifications, adaptations, and alternative embodiments thereof may be made within the scope and spirit of the present invention. For example, it may be possible to utilize other fields within the header to control other aspects of operation of the receiving apparatus to achieve further power savings. Moreover, the various functional elements of the receiving apparatus may be implemented on a single semiconductor device, such as an Application Specific Integrated Circuit (ASIC) or Digital Signal Processor (DSP), or in the alternative, may be implemented using discrete circuit devices. In addition, other types of functionally equivalent logical devices may be advantageously utilized in place of the AND logic gate, as known in the art. Alternatively, certain functional aspects of the receiving apparatus may be implemented using software or firmware systems.

The invention is further defined by the following claims.

What is claimed is:

1. An apparatus for receiving radio frequency (RF) signals and having a distinct apparatus address, comprising:

means for demodulating an RF signal to recover digital information in the form of a transmitted message packet having a header portion defining a single destination address and a variable length data portion;

means for determining said destination address from said header portion;

means for determining a message packet length from said header portion; and means for discontinuing operation of said demodulating means for an entire remaining duration of said message packet defined by said message packet length if the determined destination address does not correspond to the distinct apparatus address.

2. The receiving apparatus of claim 1, wherein said demodulating means further comprises an RF receiver and a digital match filter coupled to said RF receiver.

3. The receiving apparatus of claim 2, wherein said discontinuing means further comprises means for disabling application of RF power to said RF receiver.

4. The receiving apparatus of claim 2, wherein said discontinuing means further comprises means for disabling application of a clock signal to said digital match filter.

5. The receiving apparatus of claim 4, wherein said disabling means further comprises a logic gate having said clock signal provided to an input thereof.

6. The receiving apparatus of claim 1, wherein said determining means provides a control signal if the determined destination address does not correspond to the distinct apparatus address.

7. The receiving apparatus of claim 6, wherein said discontinuing means further comprises a power management circuit coupled to said determining means and receiving said control signal.

8. The receiving apparatus of claim 7, wherein said discontinuing means further comprises a logical AND gate having an input coupled to an output of said power management circuit.

9. The receiving apparatus of claim 1, wherein said demodulating means further comprises means for de-spreading said RF signal to recover the digital information.

10. An apparatus for receiving radio frequency (RF) signals and having a distinct apparatus address, comprising:
   means for demodulating an RF signal to recover digital information in the form of a transmitted message packet having a header portion defining a single destination address and a data portion;
   means for determining said single destination address from said header portion;
   means for determining a message packet length from said header portion; and
   means for discontinuing operation of said demodulating means if the determined destination address does not correspond to the distinct apparatus address, wherein said discontinuing means further comprises means for disabling said demodulating means for a period of time corresponding to the determined message packet length.

11. An apparatus for receiving direct sequence spread spectrum radio frequency (RF) signals and having a distinct apparatus address, comprising:
   an analog RF receiver adapted to receive an RF signal;
   a digital match filter coupled to said RF receiver, said digital match filter adapted to recover digital information from said RF signal in the form of a transmitted message packet having a header portion and a variable length data portion, said header portion defining a single destination address for said message packet and a length of said data portion of said message packet;
   means for determining at least said destination address and said message packet length from said header portion; and
   means for disabling operation of at least said analog RF receiver and said digital match filter for a period of time corresponding to the determined message packet length if the determined destination address does not correspond to the distinct apparatus address.

12. The receiving apparatus of claim 11, wherein said disabling means further comprises means for disabling application of RF power to said analog RF receiver.

13. The receiving apparatus of claim 11, wherein said disabling means further comprises means for disabling application of a clock signal to said digital match filter.

14. The receiving apparatus of claim 13, wherein said disabling means further comprises a logical AND gate having said clock signal provided to an input thereof.

15. A method for reducing electrical power usage in a direct sequence spread spectrum radio system, said radio system having a distinct apparatus address, said method comprising steps of:
   demodulating an RF signal to recover digital information in the form of a transmitted message packet having a header portion defining a single destination address and a variable length data portion;
   determining said message destination address and a message packet length from said header portion; and
   disabling said demodulating step for an entire remaining duration of said message packet defined by said message packet length if the determined address does not correspond to the distinct apparatus address.

16. The method of claim 15, wherein said demodulating step further comprises the step of de-spreading said RF signal to remove spread spectrum modulation and recover the digital information.

17. The method of claim 15, wherein said disabling step further comprises the step of disabling application of RF power to an analog RF receiver of the radio system.

18. The method of claim 15, wherein said disabling step further comprises the step of disabling application of a clock signal to a digital match filter of the radio system.

19. A method for reducing electrical power usage in a direct sequence spread spectrum radio system, said radio system having a distinct apparatus address, said method comprising steps of:
   demodulating an RF signal to recover digital information in the form of a transmitted message packet having a header portion defining a single destination address and a data portion;
   determining said message destination address from said header portion;
   disabling said demodulating step if the determined address does not correspond to the distinct apparatus address; and
   determining a message packet length from said header portion, and said disabling step further comprises disabling said demodulating step for a time interval proportional to the determined message packet length.

20. An apparatus for receiving direct sequence spread spectrum radio frequency (RF) signals and having a distinct apparatus address, comprising:
   an analog RF receiver adapted to receive an RF signal;
   a digital match filter coupled to said RF receiver, said digital match filter adapted to recover digital information from said RF signal in the form of a transmitted message packet having a header portion and a data portion, said header portion defining a single destination address of said message packet and a message packet length of said data portion;
   a control logic unit coupled to said RF receiver and said digital match filter, and having embedded instructions to perform the functions of:
      determining at least said destination address and said message packet length from said header portion; and
      disabling operation of at least said analog RF receiver and said digital match filter for a period of time corresponding to the determined message packet length if the determined destination address does not correspond to the distinct apparatus address.

21. The receiving apparatus of claim 20, wherein said control logic unit further comprises embedded instructions for disabling application of RF power to said analog RF receiver.

22. The receiving apparatus of claim 20, wherein said control logic unit further comprises embedded instructions for disabling application of a clock signal to said digital match filter.

23. The receiving apparatus of claim 22, further comprising a logical AND gate having said clock signal provided to an input thereof.

24. An apparatus for receiving radio frequency (RF) signals and having a distinct apparatus address, comprising:

an RF receiver adapted to receive an RF signal and recover digital information from said RF signal in the form of a transmitted message packet having a header portion and a variable length data portion, said header portion defining a single destination address of said message packet and a message packet length of said data portion; and a control logic unit coupled to said RF receiver and adapted to determine at least said destination address and said message packet length from said header portion, and to disable operation of portions of said RF receiver for a period of time corresponding to the determined message packet length if the determined destination address does not correspond to the distinct apparatus address.

25. The receiving apparatus of claim 24, wherein said RF receiver further comprises a digital match filter.

26. The receiving apparatus of claim 25, wherein said control logic unit is further adapted to disable application of a clock signal to said digital match filter.

27. An apparatus for receiving direct sequence spread spectrum radio frequency (RF) signals and having a distinct apparatus address, comprising:

an analog RF receiver adapted to receive an RF signal;

a digital match filter coupled to said RF receiver, said digital match filter adapted to recover digital information from said RF signal in the form of a transmitted message packet having a header portion and a variable length data portion, said header portion defining a destination address of said message packet and a message packet length of said data portion;

a control logic unit coupled to said RF receiver and said digital match filter, and having embedded instructions to perform the functions of:

reading at least said destination address and said message packet length from said header portion;

determining a length of time to transmit said data portion from said message packet length; and disabling operation of at least said analog RF receiver and said digital match filter for said determined length of time if the destination address of said message packet does not correspond to the distinct apparatus address.

28. An apparatus for receiving radio frequency (RF) signals and having a distinct apparatus address, comprising:

an RF receiver adapted to receive an RF signal and recover digital information from said RF signal in the form of a transmitted message packet having a header portion and a variable length data portion, said header portion defining a destination address of said message packet and a message packet length of said data portion; and a control logic unit coupled to said RF receiver and adapted to recover at least said destination address and said message packet length from said header portion, said control logic unit reducing electrical power applied to said RF receiver for a period of time corresponding to the message packet length if the determined destination address does not correspond to the distinct apparatus address.

* * * * *